United States Patent
Liao et al.

(10) Patent No.: US 7,206,314 B2
(45) Date of Patent: Apr. 17, 2007

(54) METHOD AND APPARATUS FOR TRANSPARENT COMMUNICATION BETWEEN A FIBRE CHANNEL NETWORK AND AN INFINIBAND NETWORK

(75) Inventors: Feejen Liao, Sunnyvale, CA (US); Dennis Makishima, Mountain View, CA (US); Howard Green, Carlsbad, CA (US); Brian Forbes, Foster City, CA (US); Daniel Chung, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1042 days.

(21) Appl. No.: 10/208,377

(22) Filed: Jul. 30, 2002

(65) Prior Publication Data

US 2004/0024905 A1   Feb. 5, 2004

(51) Int. Cl.
*H04L 12/56* (2006.01)

(52) U.S. Cl. ...................... 370/401; 370/466

(58) Field of Classification Search ............... None
See application file for complete search history.

(56) References Cited

U.S. PATENT DOCUMENTS

| | | | |
|---|---|---|---|
| 6,400,730 B1 * | 6/2002 | Latif et al. ............ | 370/466 |
| 6,671,727 B1 * | 12/2003 | Odenwald .............. | 709/227 |
| 6,683,883 B1 * | 1/2004 | Czeiger et al. ......... | 370/401 |
| 7,072,970 B2 * | 7/2006 | Georgiou et al. ....... | 709/230 |
| 2002/0165978 A1 * | 11/2002 | Chui ...................... | 709/238 |
| 2004/0022256 A1 * | 2/2004 | Green .................... | 370/401 |
| 2004/0024833 A1 * | 2/2004 | Siddabathuni .......... | 709/212 |
| 2004/0024911 A1 * | 2/2004 | Chung et al. ........... | 709/249 |
| 2006/0075191 A1 * | 4/2006 | Lolayekar et al. ...... | 711/114 |

OTHER PUBLICATIONS

InfiniBand Trade Association; *InfiniBand Architecture Specification* vol. 1, Release 1.0.a; (913 p.); Jun. 19, 2001.

* cited by examiner

*Primary Examiner*—Duc Ho
(74) *Attorney, Agent, or Firm*—Conley Rose, P.C.

(57) ABSTRACT

A system and method for providing transparent communications between an Infiniband (IB) network and a Fibre Channel (FC) network are disclosed. One method comprises: (a) detecting FC node ports in the FC network; (b) creating virtual IB targets for each FC node port in the FC network; and (c) converting IB packets directed to the virtual IB targets into FC frames directed to the corresponding FC node port. It may further comprise intercepting management packets directed to the virtual IB targets and responsively emulating a subnet management agent (SMA) of the addressed virtual IB target. Another method comprises: (a) detecting IB channel adapters; (b) creating a virtual FC target for each IB channel adapter; and (c) converting any FC frames directed to the virtual FC targets into IB packets directed to the corresponding IB channel adapter. Fabric frames directed to the virtual FC targets may be intercepted and handled appropriately.

30 Claims, 5 Drawing Sheets

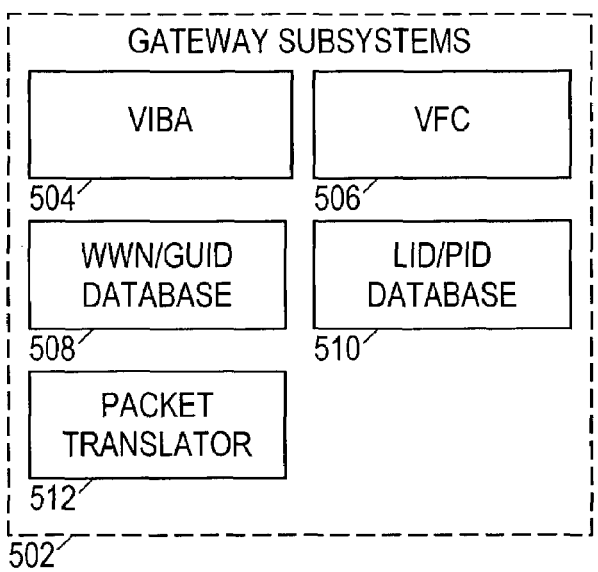
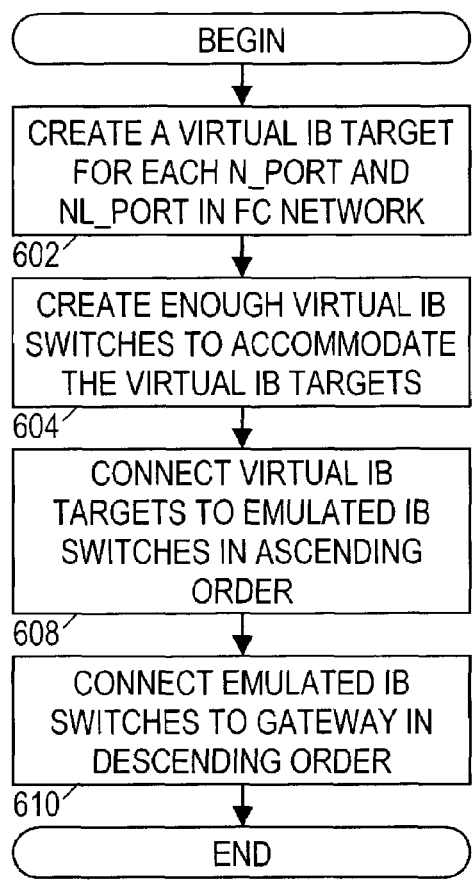
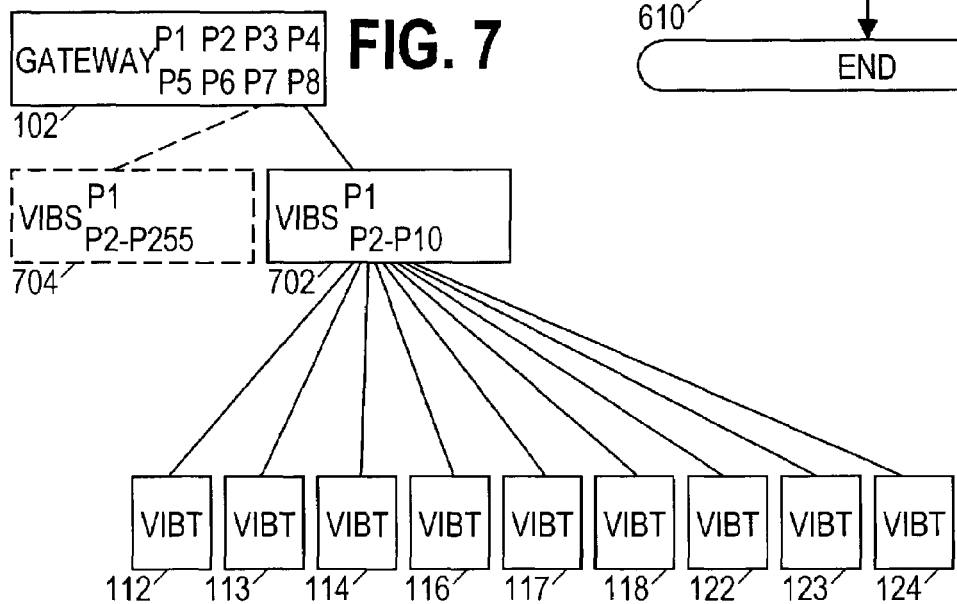

METHOD AND APPARATUS FOR TRANSPARENT COMMUNICATION BETWEEN A FIBRE CHANNEL NETWORK AND AN INFINIBAND NETWORK

CROSS-REFERENCE TO RELATED APPLICATIONS

The present application relates to co-pending U.S. patent application Ser. Nos. 10/208,378 and 10/208,425, which are filed concurrently herewith.

BACKGROUND

1. Field of the Invention

This invention generally relates to systems and methods for implementing storage area networks. More specifically, this invention relates to a method and apparatus that enables seamless communication between an Infiniband network and one or more Fibre Channel networks by emulating the Fibre Channel network(s) as a subnet of the Infiniband network.

2. Description of Related Art

Internetworking of high-performance computers has become the focus of much attention in the data communications industry. Performance improvements in processors and peripherals, along with the move to distributed architectures such as client/server configurations, have spawned increasingly data-intensive and high-speed networking applications, such as medical imaging, multimedia, and scientific visualization. Various protocols have been developed to provide the necessary communications capacity.

A protocol known as Fibre Channel can carry data at rates exceeding 2 Gbps in both directions simultaneously. The Fibre Channel protocol defines standard media and signaling conventions for transporting data in a serial fashion. It also provides an error correcting channel code and a frame structure for transporting the data. Further, the Fibre Channel protocol sets out a buffer-credit-based flow control methodology, and creates some common services (e.g., fabric controller, directory server). The Fibre Channel protocol can be applied to various network topologies including point-to-point, ring, and switched fabric. Details regarding the Fibre Channel protocol can be found online at www.fibrechannel.org.

Another, newer, protocol known as Infiniband can carry data at rates exceeding 2.5 Gbps in each direction. The Infiniband architecture is designed around a point-to-point, switched I/O fabric, that connects end node devices. Much like the Fibre Channel protocol, the Infiniband protocol defines standard media and signaling conventions for transporting data in a serial fashion, provides error detection codes and a packet structure for transporting the data, and creates some standard services (e.g., subnet manager, subnet administrator). Details regarding the Infiniband protocol can be found online at www.infinibandta.org.

While Inifiniband possesses similarities to Fibre Channel (e.g., both rely on structured serial communications, both provide standardized fabric management services, both support higher-level protocols such as SCSI (Small Computer Systems Interface), IP (Internet Protocol), and VDI (Virtual Device Interface), there are nevertheless many differences including different signaling protocols and different services. Both protocols may be employed to implement system area networks, and hence there exists a need for intercommunication between networks that use different protocols. For example, many customers would prefer to expand their existing networks with the latest technology and not have to start from scratch. Other customers just need low-latency communication between dissimilar networks. A method for integrating a Fibre Channel network into an Infiniband network is therefore highly desirable.

SUMMARY OF THE INVENTION

Accordingly, there is disclosed herein a system and method for providing transparent communications between an Infiniband (IB) network and a Fibre Channel (FC) network. In a preferred embodiment, the method comprises: (a) detecting FC node ports in the FC network; (b) creating virtual IB targets for each FC node port in the FC network; and (c) converting any non-management IB packets directed to the virtual IB targets into FC frames directed to the corresponding FC node port. The method may further comprise intercepting management packets directed to the virtual IB targets and responsively emulating a subnet management agent (SMA) or a general service agent (GSA) of the addressed virtual IB target.

The preferred embodiment further contemplates: (a) detecting IB channel adapters in the IB network; (b) creating a virtual FC target for each IB channel adapter in the IB network; and (c) converting any non-fabric FC frames directed to the virtual FC targets into IB packets directed to the corresponding IB channel adapter. Fabric frames directed to the virtual FC targets may be intercepted and handled appropriately.

The disclosed systems and methods may advantageously provide a protocol-transparent interface between IB and FC network devices.

BRIEF DESCRIPTION OF THE DRAWINGS

Various aspects of the invention will become apparent upon reading the following detailed description and upon reference to the accompanying drawings in which:

FIG. 5 shows logical subsystems of a gateway;

FIG. 6 shows a method of mapping a FC network to a virtual IB network;

FIG. 7 shows a specific example of a virtual IB network;

Figure 1:
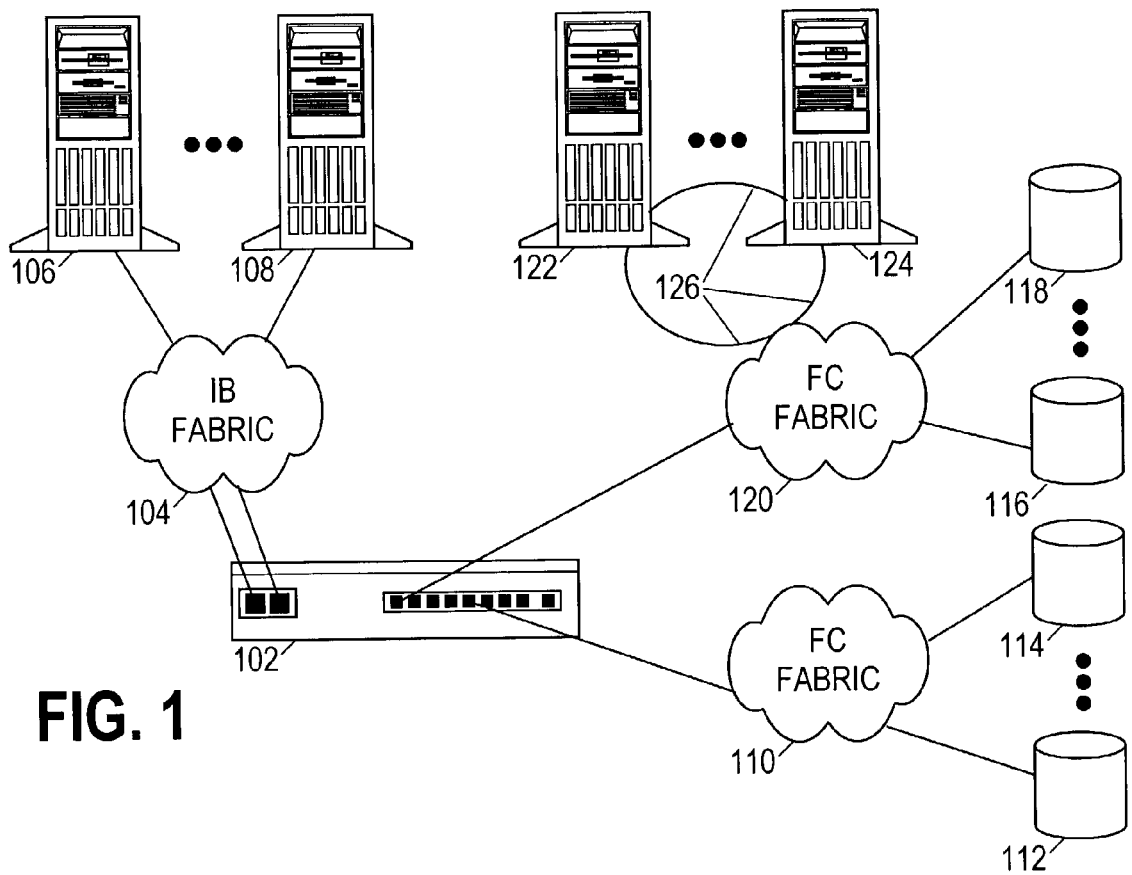
FIG. 1 shows a gateway coupled between an Infiniband (IB) and a Fibre Channel (FC) network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Interfacing IB and FC Networks

A gateway is a device that allows communication between networks that use different communications protocols. An edge router is a gateway that also provides router functionality to one or more of the networks. The following description concerns a gateway that is preferably also an edge router. The gateway preferably couples between Infiniband and Fibre Channel networks, and it preferably makes all target devices in each network "visible" to the other network(s). That is, Fibre Channel N_Ports (ports on end node devices) preferably appear to devices in the Infiniband network as remote Infiniband ports that are accessible using global addressing. Conversely, the Infiniband channel adapters preferably appear to devices in the Fibre Channel network as N_ports that are accessible using N_Port identifiers. The gateway itself preferably complies with management protocols of both Infiniband and Fibre Channel networks, presenting itself as a switch or router to the Infiniband network, and presenting itself as one or more E_Ports (expansion ports) to the Fibre Channel network.

Turning now to the figures, FIG. 1 shows a gateway 102 in a illustrative configuration that couples an Infiniband (IB) network to two Fibre Channel (FC) networks. The IB network includes a "fabric" 104 that connects processor nodes 106, 108 (storage nodes may be similarly connected) to gateway 102. The term "fabric" denotes an arbitrary arrangement of interconnected network elements that transport packets (or frames) of information between any attached nodes. The FC networks also include fabrics. One of the FC networks includes a fabric 110 that couples storage nodes 112, 114 together, and the other FC network includes a fabric 120 to couple storage nodes 116, 118 and processor nodes 122, 124. The processor nodes 116, 118 are shown coupled to the fabric 120 via an arbitrated loop 126.

Figure 2:
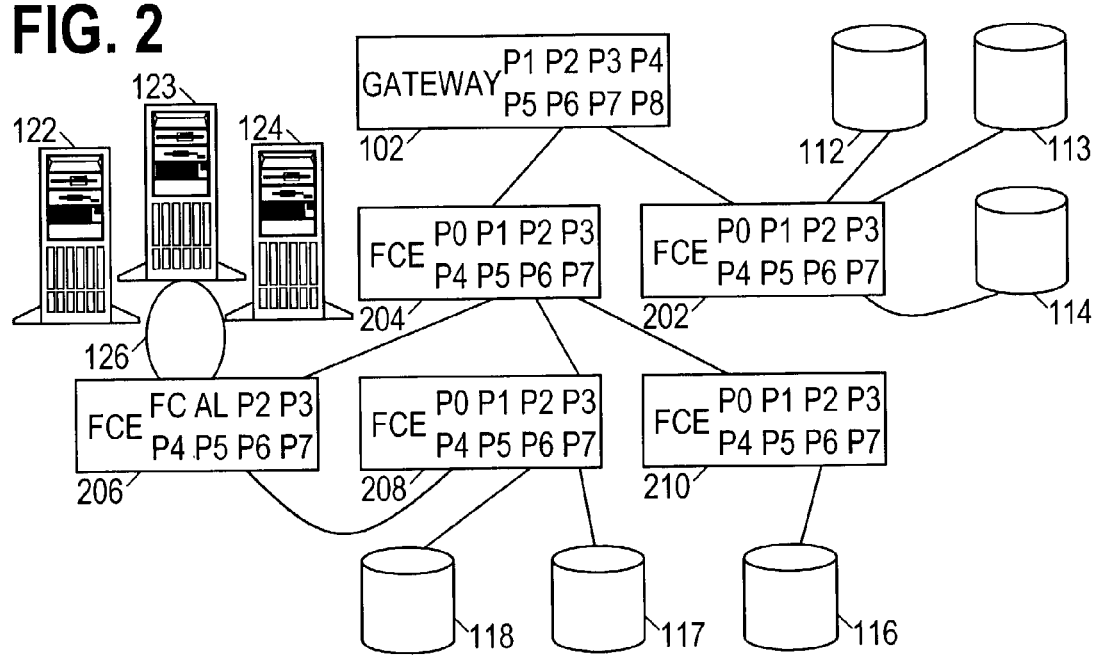
FIG. 2 shows a specific example of a FC network.

An example of the two FC networks is shown in FIG. 2. The first FC fabric 110 takes the form of a FC element (FCE) such as a switch 202. A FC link connects, say, port 7 of the gateway 102 to port 0 of switch 202. Storage devices 112–114 are coupled by respective FC links to respective ports of switch 202. Switch 202 directs frames received via any of the links to an appropriate outgoing link based on the destination address of the frame. Hence, the nodes 112–114 can communicate with each other and can send and receive frames through the gateway 102.

Figure 3:
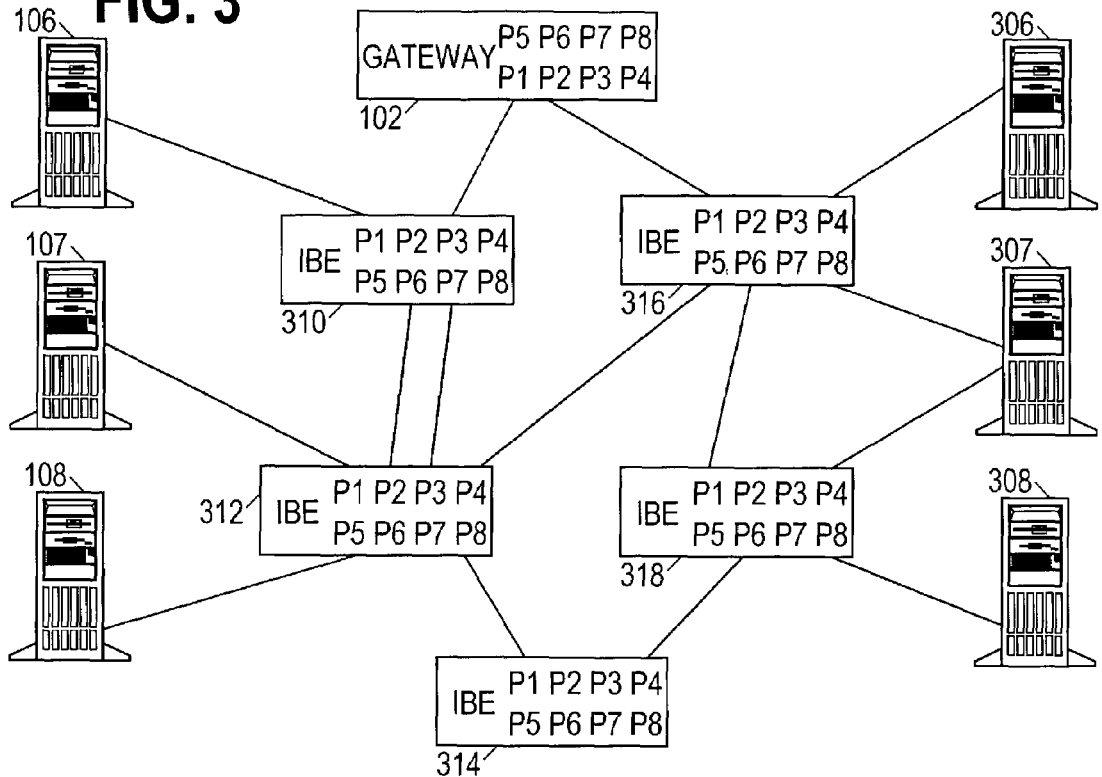
FIG. 3 shows a specific example of an IB network.

The second FC fabric takes the form of four interconnected switches 204–210. The switch network couples the storage nodes 116–118 to the processor nodes 122–124 and to the gateway 102, and transports information frames between them all. Similarly, the IB fabric 104 (as shown in FIG. 3) takes the form of five interconnected switches 310–318 that couple to processor nodes 106–108, 306–308. IB links couple (say) ports 1 and 2 of the gateway to switches 310 and 316, respectively.

Talkthrough

The gateway 102, through the use of virtual targets, may advantageously make the barrier between different network protocols "transparent". An IB device can "talk" through the gateway to a FC device without regard to (and indeed, without being aware of) the fact that the FC device operates on the FC protocol. A FC device is able to talk to IB devices in the same manner. Further details of the manner in which the gateway provides transparent communication are provided in conjunction with the following discussion of the preferred gateway embodiment.

Preferred Gateway Embodiment

Figure 4:
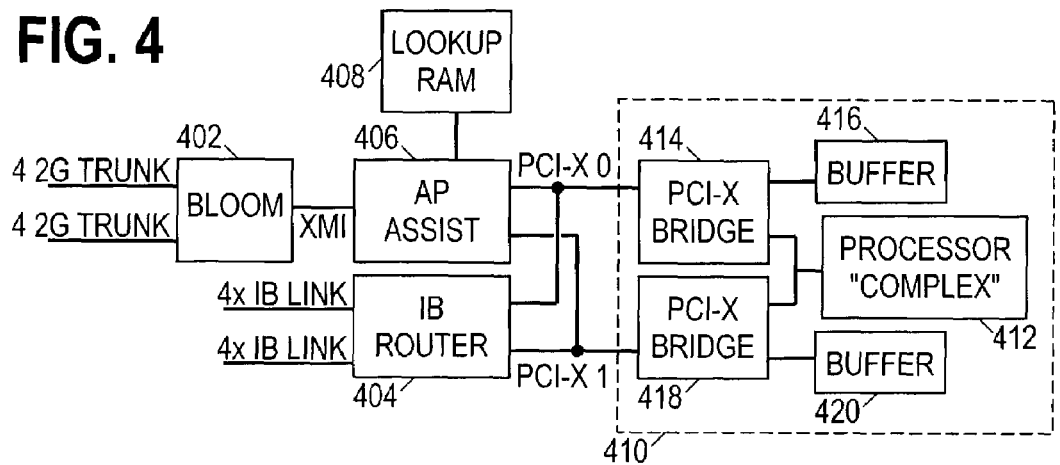
FIG. 4 shows an example of a functional block diagram for a gateway.

FIG. 4 shows a functional block diagram of a preferred embodiment of gateway 102. It includes a router ASIC, hereafter termed the "Bloom" 402, that attaches to FC links. The Bloom 402 preferably supports up to eight FC links (shown in FIG. 4 as two trunks, each carrying four 2 Gb/s FC links). The Bloom 402 couples the FC links together in the manner of a normal router (i.e., sending and receiving frames with different source and destination identifiers), and it also couples the FC links to an adjunct processor (AP) assist chip 406. The Bloom 402 provides the AP 406 with any frames directed to the gateway itself (i.e., network management packets) or frames directed to devices in the IB network. The Bloom 402 also accepts frames from the AP 406 and routes them to the appropriate destination in the FC network.

The gateway 102 also includes an IB router ASIC 404 that attaches to IB links. The IB router 404 preferably supports up to two 4× IB links. The IB router 404 couples the IB links together in the manner of a normal router, but also couples the IB links to the AP 406. The IB router provides the AP 406 with any packets directed to devices in the FC network or directed to the gateway itself, and it accepts packets from the AP 406 and routes them to the appropriate destination in the IB network.

The AP 406 is a protocol conversion engine, i.e., it provides protocol conversion between IB and FC, which includes translating FC frames to IB packets and vice versa. Further, the AP 406 preferably translates the frame/packet addressing information as specified further below, before directing non-management frames to the Bloom 402 or non-management packets to router 404. Further, the AP 406 preferably implements FC administrative services and IB management agents as needed to carry out the management roles of a router and devices from the networks in the appropriate fashion.

For example, initiation and termination of connections in an IB network is performed by communication managers (CM) in the end nodes. When the gateway 102 makes a FC device "visible" to the IB network, it does so by creating a virtual IB version (hereafter, a virtual IB target) of that FC device. An IB device attempting to connect to the FC device will contact the CM of the corresponding virtual IB target. The AP 406 preferably emulates the CM of the virtual IB target to enable the connection. Once the CM of the virtual IB target receives a connection request, it requests a Queue Pair (QP) allocation for the connection. The CM then forwards the allocated QP information to the initiating IB host as part of connection establishment handshakes. Once the initiating IB host receives the reply, it completes the connection by sending a ready response. For connections initiated from the IB side, the CM preferably follows the Passive State Transition Table. Further details are available in section 12.9.6 "Communication Establishment-Passive" in Volume 1 of the Infiniband Specification v1.0.

AP 406 preferably takes the form of a field programmable gate array (FPGA), which is preferably provided with a fast memory 408 for speed-matching buffers. These buffers are used for buffering data being moved between the IB and FC networks. The chips of gateway 102 are shown in FIG. 4 as connected by an extended memory interconnect (XMI) bus and by two extended peripheral component interconnect (PCI-X) buses. However, other buses may be used, and indeed, the various circuits may be integrated into a single chip.

Each of the routers 402, 404 maintains a table of destination addresses and the corresponding "direction" in which to send frames or packets having the specified destination addresses. The routers may also determine local addresses of the specified destination from specified global addresses, and add those to the packet or frame as appropriate. The AP 406 also maintains database tables to translate between addresses in the different network protocols. (The tables for AP 406 are stored in lookup RAM 408.) These tables may preferably be constructed by control module 410 in accordance with the protocols of the attached networks.

Control module 410 preferably includes a processor "complex" 412, i.e., one or more processors coupled to the AP 406 and the IB router 404. In the embodiment of FIG. 4, the processor complex 412 is coupled to the AP 406 and the router 404 by two PCI-X bridges 414, 418. The bridges are provided with corresponding buffers 416, 420 to prevent congestion of the PCI-X buses. The processor complex 412 preferably includes long term storage for software (or firmware) for the processor to execute. The software configures operation of the processor complex, causing it to initiate and coordinate the operation of the Bloom 402, the router 404, and the AP 406. The software may include procedures for configuring the AP 406 if it is in FPGA form. (Note that communication between the processor complex 412 and Bloom 402 may occur indirectly through AP 406 or over support buses not shown in FIG. 4.)

The software executing in control module 410 preferably models the gateway 102 as an IB router that is connected to IB fabric through real IB ports and that is connected to FC fabric through logical IB ports. To facilitate IB access to the FC network, the software creates a logical view of the FC fabric for IB Managers by configuring the AP 406 to simulate IB fabric elements. These simulated elements take the place of the FC fabric elements to create a seamless logical view of the IB network. This subsystem of the AP 406 is herein termed the Virtual Infiniband Agent (VIBA) subsystem 504 (see FIG. 5), and it is preferably implemented as a database utility.

VIBA 504 supports management datagram (MAD) queries, both direct-routed and LID (local identifier) routed. MADs are packets used for IB fabric management. A master subnet manager (SM) somewhere in the IB network is responsible for discovering the network topology, configuring each port with identifiers and partition keys, configuring each switch with a local identifier (LID) and forwarding database, and for serving as a directory. The VIBA 504 intercepts MAD queries directed to simulated IB fabric elements, and responds to those queries as the simulated elements would. Configuration information for the simulated elements is added to the database of simulated elements.

VIBA data access may be divided into two general categories: IB or FC access. An applications program interface (API) for IB access preferably exposes functions that the gateway's Common Agent Interface uses to interact with VIBA. The IB access API mainly deals with IB-related calls such as get/set (i.e., calls that get or set IB device parameters), but does not provide ability to add or create virtual elements. An FC access API exposes functions that an FC daemon on the gateway uses to create and maintain the VIBA database. It provides ability to create, add, and delete virtual elements so that VIBA can be properly manipulated when the daemon receives events from FC fabric. It also provides ability to internally retrieve and update virtual elements based on IB queries and sets.

The VIBA database is preferably organized as a tree structure, i.e., an internal data organization structure based on a flat VIBA topology. Virtual FC switches and end nodes are built in tree format based on the FC to IB port mapping method (described further below). This structure is created to facilitate traversing of virtual elements using direct routed addressing. For example, when traversing for port1–port4 direct routed addressing, software can simply follow the 'void*port[1]', and 'void*port[4]' to arrive at the desired switch or end node. The VIBA database preferably also includes a hash table, i.e., an internal data organization structure based on hashing of local identifiers (LID). The hash table contains entries that each point to a virtual FC switch or end node. This structure is created to facilitate LID routed addressing.

VIBA's main objective is to facilitate IB host access to FC devices. However, a certain level of mapping of IB hosts to FC space is also required to allow the gateway 102 to facilitate inter-network communications initiated by FC devices. Accordingly, the software also configures the AP 406 to simulate FC fabric elements that replace the IB fabric to create a seamless logical view of the FC network. This subsystem of the AP 406 is herein termed the Virtual Fibre Channel (VFC) subsystem 506, which may also be implemented in a similar fashion to the VIBA database utility.

FIG. 5 shows some of the AP subsystems 502. The subsystems include the VIBA subsystem, the VFC subsystem, a worldwide name (WWN) to globally-unique identifier (GUID) database 508, a local identifier (LID) to port identifier (PID) database 510, and a packet translator subsystem 512. The WWN/GUID mapping database 508 relates the WWN of simulated FC devices to the GUID of IB devices that the simulated FC devices represent, and relates the GUIDs of simulated IB devices to the WWNs of actual FC devices that they represent. Similarly, the LID/PID database 510 relates the PID of simulated FC N_ports to the LID of the actual IB device ports that they represent, and relates the LIDs of simulated IB ports to PIDs of actual FC N_ports that they represent.

Thus, for example, frames received by AP 406 from the FC network will have source identification (S_ID) and destination identification (D_ID) fields containing PIDs of an actual FC source node and a simulated FC destination node. For frames traveling to the IB network, the packet translator subsystem 512 uses the LID/PID database to translate the source PID into the LID of the corresponding (simulated) IB host port, and to translate the destination PID into the LID of the corresponding (actual) IB host port. Similar conversion occurs for packets traveling in the opposite direction. The WWN and GUID fields are similarly treated.

Returning to VIBA subsystem 504, the IB simulations of the FC network are preferably created and connected using a Minimum Emulation Model. This model essentially virtualizes FC end nodes (i.e., N_Ports and NL_Ports) individually, and virtualizes the FC switch fabric as a whole. While the Virtual IB Targets (VIBT) have a one-to-one relationship to unique FC end nodes, virtual IB switches generally do not have a one-to-one relationship to unique FC switches. Virtual IB switches are preferably created based on the number of virtual targets, and are used to provide connection points for the virtual targets in a flat topology regardless of the underlying FC fabric topology.

FC to IB Mapping

FIG. 6 shows a preferred method of creating an IB model for an FC network. In block 602, the AP creates a VIBT for each N_Port and NL_Port detected in the FC network. The VIBT preferably includes a virtual target channel adapter (TCA), a virtual input/output controller (IOC), and preferably a virtual input/output (IO) device, as this allows for distinct emulation of the administrative functions of each component. Alternatively, of course, a unitary virtual IB target may be created with support for the whole set of administrative functions.

In block 604, the AP creates just enough virtual IB switches to support the virtual IB targets. Each IB switch can have up to 256 ports, including port 0 which is reserved for the switch processor, and including port 1 which connects the switch to the gateway. Since IB only allows for one-to-one connection of end nodes, each IB switch can have up to 254 end nodes. Accordingly, VIBA must comply with a hard limitation of 254 virtual IB targets per virtual IB switch (VIBS). To determine the number of VIBS's, the AP 406 divides the number of VIBT's by 254, and rounds any non-integer value up to the next integer, thus performing the mathematical function ceil(N/254).

In block 608, the AP establishes switch port connections for each VIBS. The VIBT are preferably connected to the virtual IB switch ports in ascending order, starting with switch port 2, and progressing to higher port numbers. Then in block 610, the AP preferably connects the VIBS to the gateway ports in descending order, starting with the highest-numbered gateway port and progressing lower.

FIG. 7 illustrates the virtual IB network that results from the application of the FIG. 6 method to the FC network shown in FIG. 2. Virtual IB targets that replace FC devices 112–118, 122–124 are coupled to VIBS 702, which in turn is coupled to port 8 of the gateway. If more than one switch were needed, the second VIBS 704 would be coupled to port 7 of the gateway.

Note that the virtual port assignments are preferably semi-permanent. In other words, if a FC device leaves the network and later returns, it preferably is re-connected in its previous virtual location.

This then is the logical topology of router 102 and the attached FC fabric as it is presented to IB managers. VIBA may be implemented as a constantly updating database of FC elements in IB format. The VIBA may be separated into two components: a database and a FC event daemon. The FC event daemon preferably initializes the VIBA database and updates the content based on events generated by the FC fabric. Such events may include RSCN (Registered State Change Notification), SCN (State Change Notification), etc. The VIBA database would contain an IB mapping of FC elements according to the FC mapping algorithm discussed earlier. The database is preferably optimized for both direct routed and LID routed MAD queries. For example, it may have a tree structure that is also tied to a LID-based hash table. Thus, the elements can easily be queried either by direct routed based addressing or LID based addressing.

The VIBA further maintains the configuration and state information for the virtual elements in the database so that it can emulate the various IB-specified agents for those elements. For example, the IB specification 1.0 Volume 1 requires that IB switch elements each implement a Subnet Management Agent (SMA) and two General Service Agents (GSA); namely, a Performance Management Agent (PMA), and a Baseboard Management Agent (BMA). Other general service agents, such as the Device Management Agent (DMA), Communication Manager (CM), SNMP Tunneling, Vendor Specific Agents, and Application Specific Agent, are optional for switch elements. The VIBA preferably supports full emulation of SMA, PMA, and BMA per each Emulated IB Switch. For virtual IB targets, the VIBA preferably implements a SMA, a PMA, a BMA, a DMA and a CM per Name Server (NS) entry in the FC fabric.

To implement these agents, the VIBA intercepts MAD queries from the IB network that are directed to the virtual IB elements, processes (and updates) the state information stored in the database, and transmits the appropriate MAD responses.

IB to FC Mapping

Figure 8:
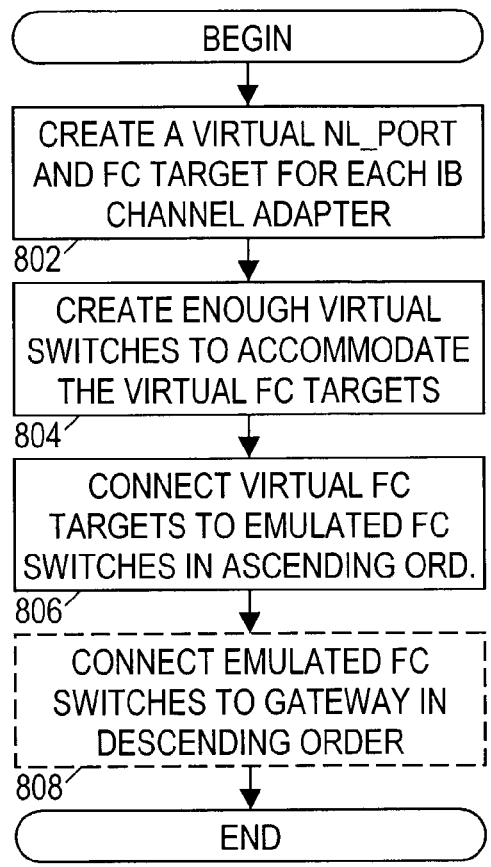
FIG. 8 shows a method of mapping an IB network into a virtual FC network.

Turning now to FIG. 8, the virtualization of the IB network is described. A mapping of the IB network to a simulated FC network is desirable to support correct FC network routing of response packets from FC targets to IB initiators and to allow FC device inquiry about IB devices through the FC Name Server (NS). The method shown in FIG. 8 is similar to the FIG. 6 method, in that IB devices are individually virtualized and the IB fabric is treated as a whole.

Beginning with block 802, the VFC subsystem of the AP creates a virtual NL_Port and FC target for each IB channel adapter in the IB network. Then in block 804, the AP creates enough virtual switches to accommodate the virtual FC targets.

The maximum number of available ports (neglecting any connection to the gateway 102) in a FC switch is 256. Each of those ports may be an arbitrated loop port (FL_Port), which can be connected to as many as 127 other devices. Accordingly, each virtual FC switch (again, neglecting any connection to gateway 102) can support up to 256*127=32,512 virtual FC targets. It may be desirable to allow for a connection to the gateway 102, either by treating the gateway as a loop port or by treating the gateway as a link port. In the first case, the switch can support up to 32,511 virtual targets. In the second case, the switch can support up to 32,385 virtual FC targets. However, in the preferred embodiment, no allowance is made for a connection to the gateway. Accordingly, in step 804, the number of virtual switches is determined by dividing the number of virtual FC targets by 32,512 and rounding any non-integer value up to the next integer, thus performing the mathematical function ceil(N/32,512).

In block 806 the virtual FC targets are coupled to the virtual FC switches in ascending order of switch port and loop position, starting with switch port 1, loop position 1, and filling the loop before progressing to the next higher switch port. If desired, the virtual switches can be coupled to the gateway ports in descending order, as illustrated by optional block 808. This is expected to be unnecessary for FC routing. The AP preferably routes the packets received from the FC network using LID/PID translation instead of port or DID translation.

Figure 9:
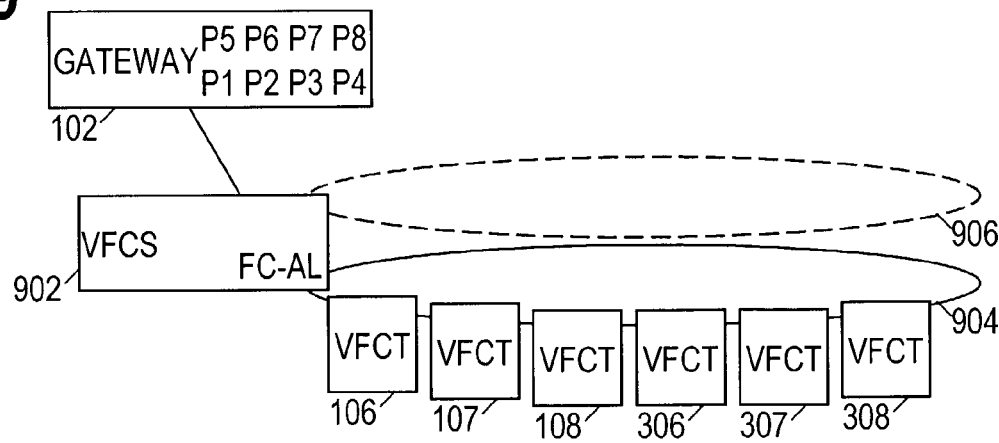
FIG. 9 shows a specific example of a virtual FC network.

FIG. 9 shows the virtual FC network that results from applying the method of FIG. 8 to the IB network of FIG. 3. The virtual network includes a virtual FC switch 902 coupled to an arbitrated loop 904. The virtual FC targets 106–108, 306–308 are on the arbitrated loop. If more than 127 virtual FC targets existed, an additional arbitrated loop 906 could be provided as shown.

In order to support IB device communications to a FC device, the response packets from the FC device need to be routed properly to the gateway using current FSPF (Fabric Shortest Path First) routing protocol. FSPF is based on the domain identification number (DID) of FC switches, and the FC standard allows only 239 such numbers. Accordingly, the number of virtual FC switches is minimized so as to minimally affect the FC network.

FC devices may inquire about IB devices through the FC name server. Accordingly, IB device information is gathered by the VFC subsystem, converted to FC conventions, and added to the name server in the FC fabric. In networks where the FC devices are not initiating inter-network communications (e.g., storage devices), this process may be limited to just those IB devices that initiate such communications. In those circumstances, the VFC subsystem gathers the name server information only when the IB device initiates communication using Communication Manager MADs. This may advantageously allow the port identifiers (PID) to be assigned based on availability of unused PIDs for the virtual switch DIDs allocated by VFC subsystem. If no more PIDs are available, then a new DID is allocated by VFC to provide additional PIDs.

Addressing Virtual Elements

Addressing within IB and FC are similar in that both networks have permanent and temporary addresses. In FC, the permanent address is WWN. In IB, it is GUID. In FC, the temporary address is PID. In IB, it is LID. However, similarity ends there and there is no easy algorithm for address conversion. Therefore mapping databases 508, 510 are used to allocate and keep track of IB-FC addressing pairs.

In order to support management packet routing and data protocol conversion, mapping of LID-to/from-PID and GUID-to/from-WWN information is stored in utility databases. These databases are updated when Subnet Manager (SM) does LID assignments, or when the gateway 102 assigns Virtual WWN or Virtual GUID. The databases are also optimized to provide easy indexing using either protocol addressing.

When Virtual IB Targets and Emulated IB Switches are created, they are assigned Virtual GUIDs. The IB standard defines GUID as a 64-bit wide unique address in IB name space. Unfortunately, there isn't a very good way to convert real WWNs to Virtual GUIDs. Accordingly, the VIBA subsystem assigns "permanent" virtual GUIDs based on the following preferred template (other templates are possible):

bits 63:40—vendor-specific number issued by IEEE
bits 39:32—product-specific number determined by vendor
bits 31:16—device-specific number (e.g., serial no.)
bits 15:0—assigned by VIBA The vendor-specific number is a unique 24-bit number assigned by the IEEE to companies desiring such a number. The product specific number is an 8-bit number that the company assigns to a given product line. So, for example, a company might assign its line of 8-port FC-to-IB gateways a product number of (say) 0xFF. The device-specific number is a 16-bit number that is unique to each device within the product line. The lowest 16 bits of the virtual GUID are assigned by the VIBA so as to give each virtual IB target and switch a unique GUID. Note that these numbers are preferably assigned on a "permanent" basis, and are preferably recycled only after an extended period of time has lapsed without usage of that number.

IB LIDs for all IB devices (including virtual IB targets) are assigned by the service manager of the IB network during the normal course of network operations. The VIBA adds the LIDs of the virtual IB targets to the LID/PID database as they are received from the service manager.

When Virtual FC Targets and switches are created, they are assigned virtual WWNs. The FC standard defines WWN as a 64-bit wide unique address in FC name space. Again, unfortunately, there isn't a very good way to convert real GUIDs to Virtual s. Thus, the VFC subsystem assigns "permanent" Virtual WWNs to based on the following preferred template (other templates are possible):

bits 63:60—address class
bits 59:36—vendor-specific number issued by IEEE
bits 35:32—product-specific number determined by vendor
bits 31:16—device-specific number (e.g., serial no.)
bits 15:0—assigned by VFC The address class is used to distinguish between device types, e.g., class 1 indicates FC switches, while class 2 indicates FC ports. Virtual WWNs preferably use a class 5 identifier to avoid address conflict with real FC devices. The vendor-specific number is the same as described previously, as is the device-specific number. The product-specific number here is a 4-bit number that the company assigns to a given product line. As before, the lowest 16 bits of the virtual WWN are assigned by the VFC subsystem to give each virtual FC target and switch a unique WWN. These 16-bit numbers are preferably assigned on a "permanent" basis, and are preferably recycled only after an extended period of time has lapsed without usage of that number.

The VFC subsystem assigns PIDs to Virtual FC Targets based on the assigned DID of the Emulated FC Switch. Since all virtual FC targets are given (semi-)permanent locations, the VFC subsystem can determine the port number and arbitrated loop position number portions of the PIDs.

Zoning and Partitioning

Gateway 102, in making the IB network appear as an FC network and the FC network appear as an IB network, preferably preserves the zoning feature of the FC network and the partitioning feature of the IB network. Zoning and partitioning are conceptually similar. A partition is a set of IB channel adapters that are allowed to communicate with each other. Insofar as possible, a given channel adapter is unaware of any other channel adapters except the ones sharing membership in its partition. It is possible for channel adapters to be members of multiple partitions. Similarly, FC N_ports are isolated from any N_Ports not in the same zone, and N_Ports can be members of multiple zones. The differences lie in the implementation. IB partition implementation relies on the use of partition keys that are embedded in each packet to designate the partition membership of that packet. FC zone implementation relies on the use of zone membership lists maintained in the switches. VIBA is not easily able to correlate zoning configuration, which already exists, with the partition keys. Hence, integrating these two features to be managed as one at peer-to-peer level presents some challenges.

In the preferred embodiment, the gateway enforces IB specific partitions and (at least at the hardware level) neglects the FC zoning configurations. The Bloom 402 is preferably configured to ignore zone membership lists for FC frames provided to AP 406, so the FC zoning configuration will have no effect on FC frames that reach the gateway en route to the IB network. The VIBA subsystem 504 obtains and stores partition key information for its virtual IB devices in response to the IB network's SM partition key assignments, and the AP 406 inserts the appropriate partition keys in the IB packets provided to the IB router 404. The IB router 404 enforces the IB-specific partitions independent of FC zoning configurations. For example, a certain amount of partition checking is required for connections to be established. As part of connection request, the partition key to be used is forwarded. The Communication Manager for a virtual IB target will check to see if the partition key is allowed for the device. If no match, the connection request is rejected. If matched, connection handshake moves forward.

The FC zoning configuration, however, is not entirely ignored. Rather, it is translated into the IB domain and managed from there. In order to manage zoning from IB, each individual FC zone is translated into a partition key (P_Key) to be stored in VIBA subsystem 504 and "pushed" to the IB SM via a vendor-defined interface to the SM partition management function. The partition keys are later used by AP 406 and IB router 404 to enforce partitioning throughout the subnet. In this manner, zoning and partitioning can be managed at a peer-to-peer level to create a single subnet view of FC/IB zoning.

Meta-zoning

Figure 10:
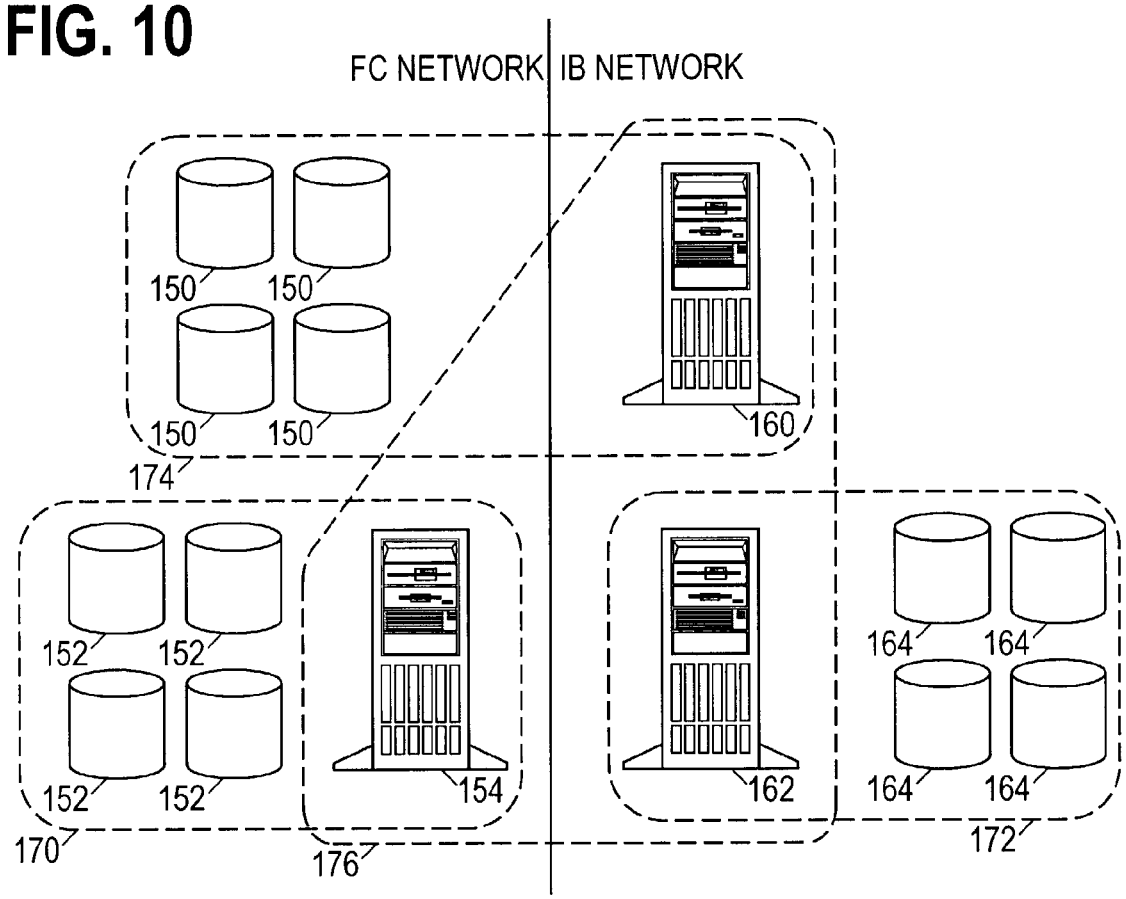
FIG. 10 shows an example of meta-zoning in an IB/FC network.

In the preferred embodiment, the gateway preferably provides ways, such as CLI (command line interface), API (application program interface), etc, to create IB-FC meta-zoning where a user specifies groups of IB and FC devices that should have access to one another. Referring to FIG. 10, for example, a user may wish to specify four meta-zones 170–176. Meta-zone 170, which is a FC zone, includes FC devices 152 and 154. Meta-zone 172, which is an IB partition, includes IB devices 162 and 164. Meta-zone 174, which is a cross-protocol zone/partition, includes devices 150 and 160. Meta-zone 176, which overlaps other meta-zones and is a cross-protocol zone/partition, includes devices 154, 160, 162. When meta-zones are enabled, a given device can only communicate with other devices that are members of a meta-zone that includes the given device.

The gateway may then automatically propagate the meta-zoning configuration to FC zoning service and the IB subnet manager (SM). The creation of meta-zoning can be facilitated by the gateway providing a list of IB devices retrieved through Subnet Administration and a list of FC devices retrieved through Name Server. Accordingly, device discovery and virtual mapping is preferably done before any zoning takes place.

For greater efficiency, virtual addresses may be assigned to the identified devices after the meta-zoning has been configured. The list of FC targets to be virtualized can then be calculated based on zoning configuration. If any active or passive zoning configurations contain a virtual WWN of an IB host, all WWN or PID of the FC devices listed in the same zone are assigned Virtual GUID and virtualized by IBAV. If the zoning is disabled or zoning configurations do not contain any Virtual WWN, no devices are virtualized. The virtual WWNs of the IB devices to be mapped are used in setting up the FC zone configuration. IB partition configuration may proceed afterward.

Numerous variations and modifications will become apparent to those skilled in the art once the above disclosure is fully appreciated. It is intended that the following claims be interpreted to embrace all such variations and modifications.

What is claimed is:

1. A method of routing Infiniband (IB) packets to a Fibre Channel (FC) network, the method comprising:
   detecting FC node ports in the FC network;
   creating a virtual IB target for each FC node port in the FC network;
   converting any non-management IB packets directed to the virtual IB targets into FC frames directed to the corresponding FC node port;
   intercepting any management packets directed to the virtual IB targets; and
   emulating a subnet management agent (SMA) or a general service agent (GSA) of a virtual IB target in response to a management packet.

2. The method of claim 1, wherein said creating a virtual IB target for each FC node port includes:
   assigning a globally unique identifier (GUID) to each virtual IB target.

3. The method of claim 2, wherein said converting includes:
   replacing a GUID in the non-management IB packet with a world-wide name (WWN) of the corresponding FC node port.

4. The method of claim 1, further comprising:
   receiving a local identifier (LID) for each of the virtual IB targets.

5. The method of claim 4, wherein said converting includes:
   replacing a LID in the non-management packet with a PC port identifier of the corresponding FC node port.

6. A method of routing FC frames to an IB network, the method comprising:
   detecting IB channel adapters in the IB network;
   creating a virtual FC target for each IB channel adapter in the IB network;
   converting any non-fabric FC frames directed to the virtual FC targets into IB packets directed to the corresponding IB channel adapter;
   emulating a fabric login procedure for each virtual FC target; and
   generating an appropriate response to any fabric frames directed to the virtual FC target.

7. The method of claim 6, wherein said creating a virtual FC target for each IB channel adapter includes:
   assigning a world wide name (WWN) to each virtual FC target.

8. The method of claim 7, wherein said converting includes:
   replacing a WWN in the non-fabric frame with a globally unique identifier (GUID) of the corresponding IB channel adapter.

9. The method of claim 6, further comprising:
   determining a port identifier (PID) for each of the virtual FC targets.

10. The method of claim 9, wherein said converting includes:
    replacing a (PID) in the non-fabric packet with an IB local identifier (LID) of the corresponding IB channel adapter.

11. A gateway to connect Fibre Channel (FC) and Infiniband (IB) networks, wherein the gateway comprises:
    one or more FC ports configured to couple to FC networked devices;
    one or more IB ports configured to couple to IB networked devices; and
    a protocol conversion engine coupled between the FC and IB ports,
wherein the engine is configured to provide transparent communication between at least one of the IB networked devices and at least one of the FC networked devices by:

detecting FC node ports in the FC network;

creating a virtual IB target for each FC node port in the FC network;

converting any non-management IB packets directed to the virtual IB targets into FC frames directed to the corresponding FC node port;

intercepting any management packets directed to the virtual IB targets; and emulating a subnet management agent (SMA) or a general service agent (GSA) of a virtual IB target in response to a management packet.

12. The gateway of claim 11, wherein said creating a virtual IB target for each FC node port includes:

assigning a globally unique identifier (GUID) to each virtual IB target.

13. The gateway of claim 12, wherein said converting includes:

replacing a GUID in the non-management IB packet with a world-wide name (WWN) of the corresponding FC node port.

14. The gateway of claim 11, wherein the engine further provides transparent communication by:

receiving a local identifier (LID) for each of the virtual IB targets.

15. The gateway of claim 14, wherein said converting includes:

replacing a LID in the non-management packet with a FC port identifier of the corresponding FC node port.

16. The gateway of claim 11, wherein the engine further provides transparent communication by:

detecting IB channel adapters in the IB network;

creating a virtual FC target for each IB channel adapter in the IB network; and converting any non-fabric FC frames directed to the virtual FC targets into IB packets directed to the corresponding IB channel adapter.

17. The gateway of claim 16, wherein the engine further provides transparent communication by:

emulating a fabric login procedure for each virtual FC target; and generating an appropriate response to any fabric frames directed to the virtual FC target.

18. The gateway of claim 16, wherein said creating a virtual FC target for each IB channel adapter includes:

assigning a world wide name (WWN) to each virtual FC target.

19. The gateway of claim 18, wherein said converting includes:

replacing a WWN in the non-fabric flame with a globally unique identifier (GUID) of the corresponding IB channel adapter.

20. The gateway of claim 16, wherein the engine further provides transparent communication by:

determining a port identifier (PID) for each of the virtual FC targets.

21. The gateway of claim 20, wherein said converting includes:

replacing a PID in the non-fabric packet with an IB local identifier (LID) of the corresponding IB channel adapter.

22. A computer network that comprises:

a Fibre Channel (FC) network that includes at least one FC target device configured to transmit and receive FC frames;

an Infiniband (IB) network that includes at least one IB target device configured to transmit and receive IB packets;

a gateway coupled between the FC network and the IB network, the gateway is configured to provide transparent communications between said at least one FC target device and said at least one IB target device;

the gateway provides transparent communications by making available one virtual FC target for each accessible IB target device in the IB network; and the gateway is configured to participate in initialization procedures of the FC network, and is further configured to emulate a fabric login of the virtual FC targets.

23. The computer network of claim 22, wherein the gateway provides transparent communications by making available one virtual IB target for each accessible FC target device in the FC network.

24. The computer network of claim 23, wherein the gateway allocates a globally unique identifier (GUID) for each of the virtual IB targets.

25. The computer network of claim 24, wherein the gateway maintains a database to associate the GUID of each virtual IB target with a world-wide name (WWN) of a corresponding FC target device.

26. The computer network of claim 23, wherein the gateway intercepts management datagrams directed to the virtual IB targets and emulates subnet management agent (SMA) and general service agents (GSA) for the addressed virtual IB targets.

27. The computer network of claim 26, wherein the gateway is configured to convert non-management packets directed to the virtual IB targets into frames directed to a corresponding FC target device.

28. The computer network of claim 22, wherein the gateway allocates a WWN for each of the virtual FC targets.

29. The computer network of claim 28, wherein the gateway maintains a database to associate the WWN of each virtual FC tax get with a GUID of a corresponding IB target device.

30. The computer network of claim 22, wherein the gateway is configured to convert non-fabric frames directed to the virtual FC targets into packets directed to corresponding IB target devices.

* * * * *